(12) United States Patent
Harel et al.

(10) Patent No.: US 11,720,484 B2
(45) Date of Patent: Aug. 8, 2023

(54) SYSTEM AND METHOD FOR EFFICIENT BACKGROUND DEDUPLICATION DURING HARDENING

(71) Applicant: EMC IP Holding Company, LLC, Hopkinton, MA (US)

(72) Inventors: Bar Harel, Tel Aviv (IL); Maor Rahamim, Ramla (IL); Uri Shabi, Tel Mond (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 16/940,952

(22) Filed: Jul. 28, 2020

(65) Prior Publication Data

US 2022/0035734 A1 Feb. 3, 2022

(51) Int. Cl.
*G06F 12/02* (2006.01)
*G06F 12/0897* (2016.01)

(52) U.S. Cl.
CPC ........ *G06F 12/023* (2013.01); *G06F 12/0897* (2013.01)

(58) Field of Classification Search
None
See application file for complete search history.

(56) References Cited

U.S. PATENT DOCUMENTS

| | | | |
|---|---|---|---|
| 2009/0177857 A1* | 7/2009 | Butterworth | G06F 11/1453 711/E12.103 |
| 2013/0013865 A1* | 1/2013 | Venkatesh | G06F 12/126 711/E12.07 |
| 2014/0115258 A1* | 4/2014 | Week | G06F 16/1752 711/163 |
| 2016/0092137 A1* | 3/2016 | Doerk | G06F 3/0619 711/159 |
| 2019/0129806 A1* | 5/2019 | Hsu | G06F 3/0641 |
| 2019/0227941 A1* | 7/2019 | Chang | G06F 3/0611 |

* cited by examiner

*Primary Examiner* — Charles Rones
*Assistant Examiner* — Ryan Dare
(74) *Attorney, Agent, or Firm* — Brian J. Colandreo; Heath M. Sargeant; Holland & Knight LLP (57) ABSTRACT

A method, computer program product, and computer system for identifying, by a computing device, content in a first bucket in a first cache. It may be determined that a first portion of the content in the first bucket is a duplicate, wherein a second portion of the content in the first bucket may be unique. The first portion of the content in the first bucket may be deduplicated from the first cache. The second portion of the content may be stored in a second bucket in a second cache.

20 Claims, 4 Drawing Sheets

SYSTEM AND METHOD FOR EFFICIENT BACKGROUND DEDUPLICATION DURING HARDENING

BACKGROUND

Many storage systems may perform various data deduplication techniques for the purpose of improving storage utilization. While not required, such systems generally use a hash table, which stores a mapping of the hash of a page to the location of which the page is stored.

BRIEF SUMMARY OF DISCLOSURE

In one example implementation, a method, performed by one or more computing devices, may include but is not limited to identifying, by a computing device, content in a first bucket in a first cache. It may be determined that a first portion of the content in the first bucket is a duplicate, wherein a second portion of the content in the first bucket may be unique. The first portion of the content in the first bucket may be deduplicated from the first cache. The second portion of the content may be stored in a second bucket in a second cache.

One or more of the following example features may be included. The first cache may be in-memory. The second cache may be in persistent storage. Deduplicating the first portion of the content in the first bucket from the first cache may occur during a hardening process. Deduplicating the first portion of the content in the first bucket from the first cache may be based upon, at least in part, a threshold workload. Deduplicating the first portion of the content in the first bucket from the first cache may include identifying the first portion of the content in a log. Deduplicating the first portion of the content in the first bucket from the first cache may further include scanning the log to identify the first portion of the content in the first bucket as the duplicate.

In another example implementation, a computing system may include one or more processors and one or more memories configured to perform operations that may include but are not limited to identifying content in a first bucket in a first cache. It may be determined that a first portion of the content in the first bucket is a duplicate, wherein a second portion of the content in the first bucket may be unique. The first portion of the content in the first bucket may be deduplicated from the first cache. The second portion of the content may be stored in a second bucket in a second cache.

One or more of the following example features may be included. The first cache may be in-memory. The second cache may be in persistent storage. Deduplicating the first portion of the content in the first bucket from the first cache may occur during a hardening process. Deduplicating the first portion of the content in the first bucket from the first cache may be based upon, at least in part, a threshold workload. Deduplicating the first portion of the content in the first bucket from the first cache may include identifying the first portion of the content in a log. Deduplicating the first portion of the content in the first bucket from the first cache may further include scanning the log to identify the first portion of the content in the first bucket as the duplicate.

In another example implementation, a computer program product may reside on a computer readable storage medium having a plurality of instructions stored thereon which, when executed across one or more processors, may cause at least a portion of the one or more processors to perform operations that may include but are not limited to identifying content in a first bucket in a first cache. It may be determined that a first portion of the content in the first bucket is a duplicate, wherein a second portion of the content in the first bucket may be unique. The first portion of the content in the first bucket may be deduplicated from the first cache. The second portion of the content may be stored in a second bucket in a second cache.

One or more of the following example features may be included. The first cache may be in-memory. The second cache may be in persistent storage. Deduplicating the first portion of the content in the first bucket from the first cache may occur during a hardening process. Deduplicating the first portion of the content in the first bucket from the first cache may be based upon, at least in part, a threshold workload. Deduplicating the first portion of the content in the first bucket from the first cache may include identifying the first portion of the content in a log. Deduplicating the first portion of the content in the first bucket from the first cache may further include scanning the log to identify the first portion of the content in the first bucket as the duplicate.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Figure 1:
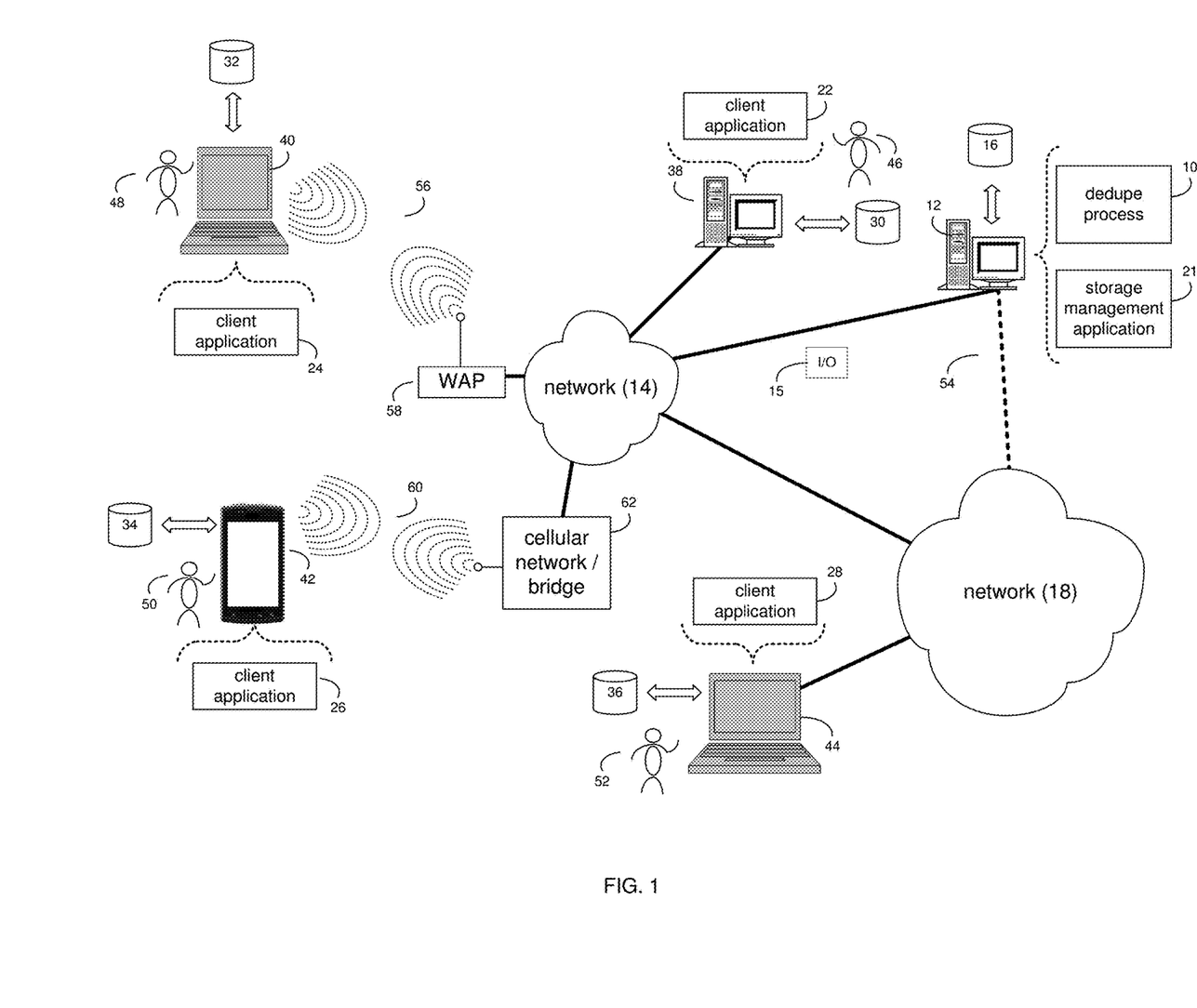
FIG. 1 is an example diagrammatic view of a dedupe process coupled to an example distributed computing network according to one or more example implementations of the disclosure.

Referring now to the example implementation of FIG. 1, there is shown dedupe process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a dedupe process, such as dedupe process 10 of FIG. 1, may xx.

In some implementations, the instruction sets and subroutines of dedupe process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, dedupe process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, dedupe process 10 and/or storage management application 21 may be accessed via one or more of client applications 22, 24, 26, 28. In some implementations, dedupe process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within dedupe process 10, a component of dedupe process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of dedupe process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of dedupe process 10 (and vice versa). Accordingly, in some implementations, dedupe process 10 may be a purely server-side application, a purely client-side application, or a hybrid server-side/client-side application that is cooperatively executed by one or more of client applications 22, 24, 26, 28 and/or dedupe process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, dedupe process 10, and storage management application 21, taken singly or in any combination, may effectuate some or all of the same functionality, any description of effectuating such functionality via one or more of client applications 22, 24, 26, 28, dedupe process 10, storage management application 21, or combination thereof, and any described interaction(s) between one or more of client applications 22, 24, 26, 28, dedupe process 10, storage management application 21, or combination thereof to effectuate such functionality, should be taken as an example only and not to limit the scope of the disclosure.

In some implementations, one or more of users 46, 48, 50, 52 may access computer 12 and dedupe process 10 (e.g., using one or more of client electronic devices 38, 40, 42, 44) directly through network 14 or through secondary network 18. Further, computer 12 may be connected to network 14 through secondary network 18, as illustrated with phantom link line 54. Dedupe process 10 may include one or more user interfaces, such as browsers and textual or graphical user interfaces, through which users 46, 48, 50, 52 may access dedupe process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
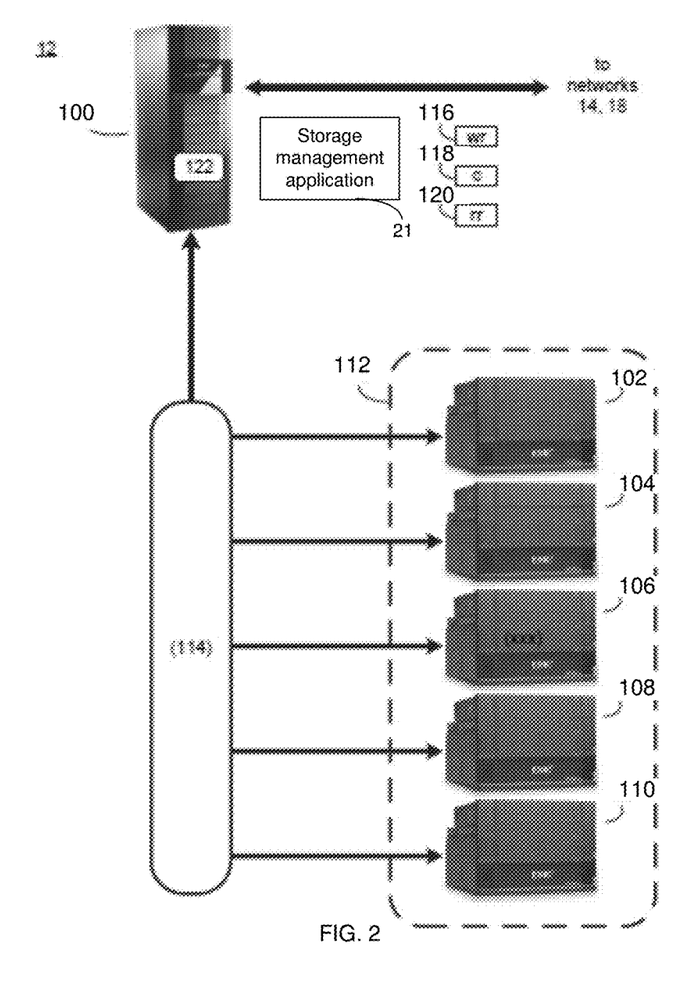
FIG. 2 is an example diagrammatic view of a storage system of FIG. 1 according to one or more example implementations of the disclosure.
Figure 3:
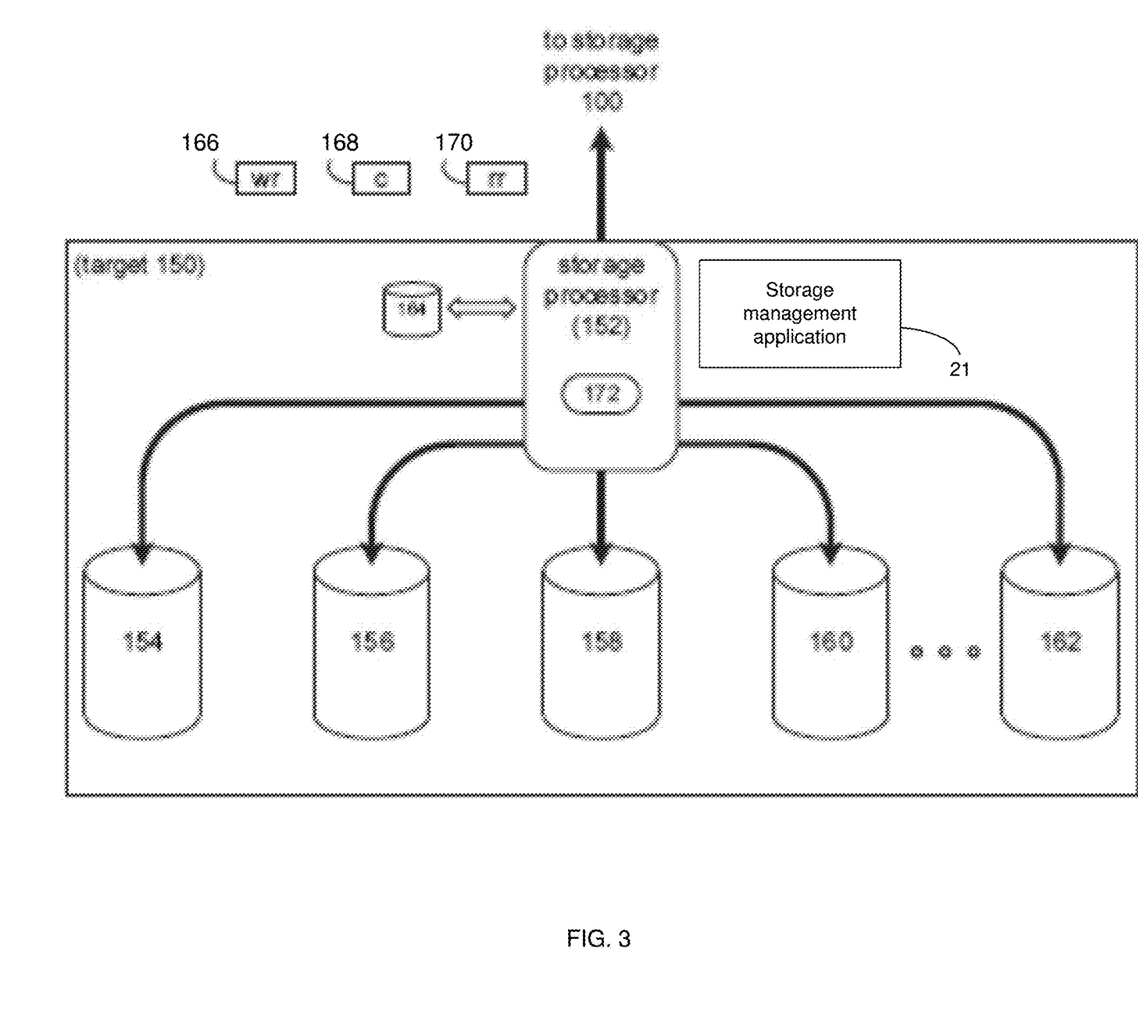
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™, VNX™, TRIDENT™, or Unity™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or dedupe process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VPLEX™, VNX™, TRIDENT™, or Unity™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/ corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

Many storage systems may perform various data deduplication techniques for the purpose of improving storage utilization. While not required, such systems generally use a hash table, which stores a mapping of the hash of a page to the location of which the page is stored. The hash table described may be completely or partially hardened (e.g., stored persistently on persistent storage), and for methods of caching to be practiced on it. Deduplication in a storage system which use a partially or completely hardened hash table may include candidates that have their hash entry stored in persistent media. Access to the hardened caching levels of the hash table may be costly compared to the in-memory levels, and therefore performing lookup to hardened caches for inline deduplication purposes may reduce the storage throughput. That is, performing lookup in the persistent media may be costly, and therefore performing inline deduplication may requiring such a lookup may greatly increase read amplification and eventually even reduce system throughput.

There may be many approaches for solving this issue. For example, it may be possible to defer deduplication on candidates in which their deduplication hash table targets reside in the persistent media. Afterward, the system may initiate a garbage collection process, which may scan through all the system pages, and may look up the deduplication candidates already stored on persistent media. This may be optimized by marking data which was not already fully analyzed (meaning it was only partially looked up, e.g., only on the in-memory level), and completing the deduplication inquiry according to the mark. However, even if there are very efficient optimizations being used, the lookup in the hash-table stored on persistent media may still result in a read (perhaps an aggregated read), and unless the hash was stored on persistent media along with the page, an additional hash computation, which was already performed for the in-memory lookup, may be needed.

As such, as will be discussed below, the present disclosure discusses a storage device access optimized method to perform post-process deduplication on data being stored, of which deduplication candidates were not on the in-memory dedupe cache levels. In some implementations, the present disclosure may defer lookup of such deduplication candidates described above to the hardening process of the hash table, and yet may perform inline deduplication on all pages that have deduplication candidates in the in-memory levels while being stored persistently.

As will be discussed below, dedupe process 10 may at least help, e.g., improve computer storage technology, necessarily rooted in computer technology in order to overcome an example and non-limiting problem specifically arising in the realm of computer storage networks associated with, e.g., the practical application of data deduplication. It will be appreciated that the computer processes described throughout are integrated into one or more practical applications, and when taken at least as a whole are not considered to be well-understood, routine, and conventional functions.

Figure 4:
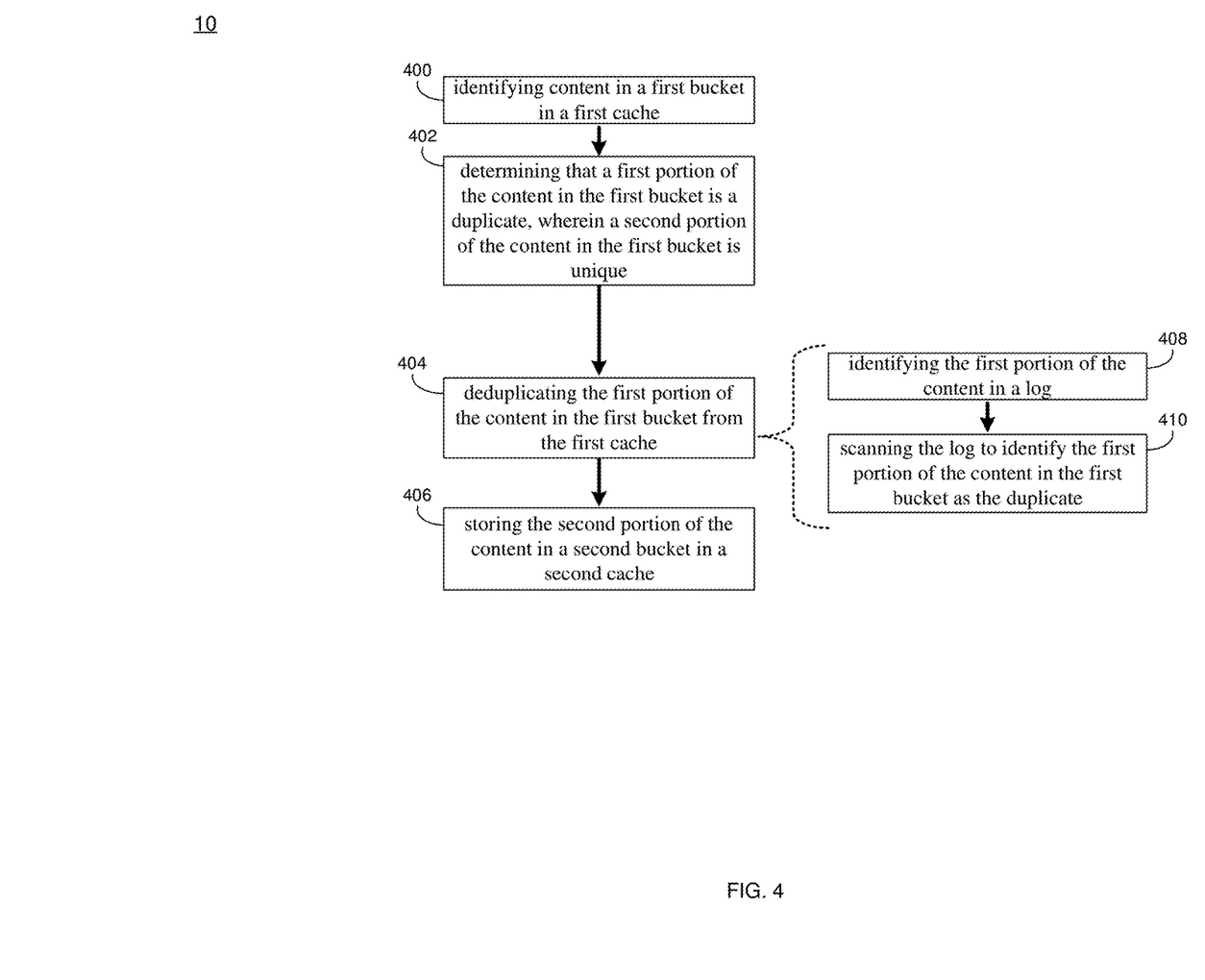
FIG. 4 is an example flowchart of a dedupe process according to one or more example implementations of the disclosure.

The Dedupe Process:

As discussed above and referring also at least to the example implementations of FIG. 4, deduplication (dedupe) process 10 may identify 400, by a computing device, content in a first bucket in a first cache. Dedupe process 10 may determine 402 that a first portion of the content in the first bucket is a duplicate, wherein a second portion of the content in the first bucket may be unique. Dedupe process 10 may deduplicate 404 the first portion of the content in the first bucket from the first cache. Dedupe process 10 may store 406 the second portion of the content in a second bucket in a second cache.

As generally discussed above, during the flow of data into the storage system, it may not be ideal to perform a full deduplication lookup. Full in-line deduplication lookup may introduce overhead for the computation of hashes as well as the lookup in the in-memory and hardened dedupe index, with the lookup in persistent media generally being considered more expensive than the lookup in the in-memory hash table. Therefore, in some implementations, dedupe process 10 may suggest that in-line deduplication may only consider the in-memory cache level of the hash table (e.g., it may perform a look up on it and may insert it while ignoring the persistent levels of the cache). This may leave the in-line deduplication to perform cheap lookups in memory (as well as computing hashes).

Generally, a storage system that performs deduplication techniques using in-memory and persistent hash tables that also practice caching methods have a hardening process from one caching level to another caching level. Such hardening process may take dirty entries from an upper caching level and may merge them with existing entries in the lower caching level. Usually, there may be an eviction policy being used for cases of the above merge resulting in too many entries to be hardened on persistent media.

For ease of understanding, a simple implementation is discussed throughout where there are only two levels, one in-memory while the other is on persistent media; however, it will be appreciated that it is possible to have multiple tiers of caching without departing from the scope of the disclosure. As will be discussed below, dedupe process 10 may use the hardening process for its benefit and may look for deduplication candidates while the merge between deduplication cache levels takes place. For the example implementation of the caching levels, it may include an in-memory hash table cache and one or more additional, multiple levels of hash table cache in persistent media.

In the example, each bucket of a caching level hash table may correspond with a bucket in the next level of the caching in an injective form, where generally buckets will become larger from level to level (since generally cheaper storage is used from level to level, and therefore the capacity used in it is cheaper as well). The meaning of a bucket in a caching level corresponding with a bucket in the next caching level in an injective form is that they may have the same (or at least similar) bucket index in the hash table. Once a bucket in any caching level reaches a predetermined threshold of fullness (fullness in the sense that adding too many additional entries may cause dirty entries, which were not persisted to the next caching level, may be popped out, causing possible data loss), it may be hardened to the next level, and may mark all its entries as clean.

Buckets may be stored in a sorted data structure for efficient lookup (e.g., a sorted array). Using this as an example only, below describes a simple implementation of a multi-level caching hash table used for deduplication, as well as its hardening process between cache levels. As will be discussed below, in some implementations, deduplicating 404 the first portion of the content in the first bucket from the first cache may occur during a hardening process. An example hardening process may be performed as follows:

A bucket may be read from the next caching level (e.g., from persistent media) and may be merged with the bucket from the current caching level (which was already read if it was not already in memory). Entries of both buckets may have the same (or similar) bucket index in the hash mapping. This means that some of its bits (which may be predetermined as bucket bits) of all hashes of both buckets are identical. As a result, all the dedupe potential candidates of the bucket being hardened in the cache level currently being hardened to are at this very bucket dedupe process 10 has read for hardening purposes (since any other entry of any other bucket will have another bucket index and therefore other bucket bits). Therefore, by this point, dedupe process 10 has already read and has in-memory all of the possible candidates for deduplication in this dedupe-level (cache). Since bucket are sorted, before performing a merge between buckets, dedupe process 10 may simply lookup by hash (or other similar technique) on all the entries that are due to be hardened, in the bucket dedupe process 10 is hardening to, and perform dedupe if there is a hit (e.g., hash match). The above is read-optimal, since the deduplication process adds no read amplification for dedupe metadata pages, and possibly adds a read only for the compare of data (in case there is little trust the hash for guaranteeing the data is identical), which was already a must for any possible deduplication scheme.

An example of the above will now be described. In some implementations, dedupe process 10 may identify 400 content in a first bucket in a first cache (e.g., in an in-memory cache such as static RAM or SRAM). In the example, for simplicity purposes only, there are only two levels of caching, 1 is in-memory and has 2 buckets of maximum size 2, and 1 is on top of, e.g., SSD and has 2 buckets of maximum size 4. In the example, X will indicate an empty entry, and further in the example, every hash is stored with additional metadata used to locate its corresponding data:

L1: [bucket 0: X,X], [bucket 1: X,X]
L2: [bucket 0: X,X,X,X], [bucket 1: X,X,X,X]

Assume in the example that the user has written 4 pages, e.g.: $P_0$, $P_1$, $P_2$, $P_3$, which correspond with hashes $h_0$, $h_1$, $h_2$, $h_3$, which were distributed to buckets on level 1 as follows:

L1: [bucket 0: $h_0$, $h_1$], [bucket 1: $h_2$, $h_3$]

Further assume that afterward, the buckets were hardened to L2, since the system was not heavily utilized and the buckets were full:

L1: [bucket 0: $h_0$, $h_1$], [bucket 1: $h_2$, $h_3$]
L2: [bucket 0: $h_0$, $h_1$, X, X], [bucket 1: $h_2$, $h_3$, X, X]

Further assume that now user has written another 4 pages, e.g.: $P_4$, $P_5$, $P_6$, $P_7$ which were distrusted as follows:

L1: [bucket 0: $h_4$, $h_5$], [bucket 1: $h_6$, $h_7$]

Further assume yet again that L1 was completely hardened to L2:

L1: [bucket 0: $h_4$, $h_5$], [bucket 1: $h_6$, $h_7$]
L2: [bucket 0: $h_0$, $h_1$, $h_4$, $h_5$], [bucket 1: $h_2$, $h_3$, $h_6$, $h_7$]

In the example, now assume that the user starts writing data that can be deduplicated, e.g.: $P_0$, $P_7$ In some implementations, dedupe process 10 may determine 402 that a first portion of the content in the first bucket is a duplicate, wherein a second portion of the content in the first bucket may be unique, and in some implementations, dedupe process 10 may deduplicate 404 the first portion of the content in the first bucket from the first cache, where dedupe process 10 may store 406 the second portion of the content in a second bucket in a second cache (e.g., in persistent storage such as dynamic RAM or DRAM, which is slower and cheaper than SRAM). For example, lookup may be executed in-line in L1 and $P_7$'s corresponding hash, $h_7$ is found in bucket 1 in memory and is deduped. On the other hand, $h_0$ is not found in memory (as it is unique) and is added to L1:

L1: [bucket 0: $h_0$, $h_5$], [bucket 1: $h_6$, $h_7$]
L2: [bucket 0: $h_0$, $h_1$, $h_4$, $h_5$], [bucket 1: $h_2$, $h_3$, $h_6$, $h_7$]

During hardening from L1 to L2, thus, there is a single entry considered dirty in bucket 0: $h_0$.

While merging the bucket, dedupe process 10 may look up and find it in the corresponding L2 bucket and may dedupe the data as well. All the deduplication opportunities were fulfilled, and no additional read of L2 buckets were needed, except for hardening purposes, which would have happened anyway.

As another example, regarding mapping between dedupe cache levels, dedupe process 10 may compute the hash on each page that is written to the system. For instance, assume for example purposes only that the system only has two dedupe (cache) levels, one in memory and one on disk (or other persistent storage media). The one in memory with, e.g., 1,048,576 buckets (2^20), and the on-disk with, e.g., 8,388,608 buckets (2^23). Dedupe process 10 may define the dedupe index hash tables by choosing buckets according to bucket bits which may be defined in each hash. Assume for example purposes only that the first 20 bits in each hash determine in which bucket it will be sent to in the in-memory index, and further assume that the first 23 bits in each hash determines the same for the on-disk index. Pages may only be in a bucket that is of the index which is as the bucket bits in the hash of the page. Thus, for each page, if dedupe process 10 wants to check whether it has an entry on one of the dedupe indices, all that is needed to do is compute the hash, extract 23 bucket bits, look in bucket #first_20_bucket_bits in memory, if it is not there, look in bucket #first_23_bucket_bits_on_disk. This provides a 1:1 mapping for each page and its in-memory bucket and in-disk bucket.

In the example, the hardening process will be the hardening of the bucket to its 8 corresponding on-disk buckets (e.g., bucket 0 in memory→buckets 0, 1, 2 . . . , 6, 7 on disk; bucket 1 in memory→buckets 8, 9, . . . , 15 on disk). Since the hardening process of a bucket is of pages which hash bucket_bits are the same (or similar), it means that deduplication candidates can only be in this bucket. It will be appreciated that the above mapping example is merely for example purposes only and that any other mapping technique may be used without departing from the scope of the present disclosure.

In some implementations, deduplicating 404 the first portion of the content in the first bucket from the first cache may be based upon, at least in part, a threshold workload. For example, a possible drawback to the above may be that under very strong workloads the actual computation of the hash may be too costly on its own, and may reduce throughput, and therefore the solution suggested in previous solutions may be superior, since it may simply defer the hash computation to a garbage collection phase by reading data. This may be solved by performing a hybrid solution between the two. For instance, under very high workload (e.g., some threshold workload), no deduplication will be performed, and the garbage collection solution will perform data reduction once the system will reach a low workload threshold, and since the workload is low, for those pages there may be an increased read amplification as well as non-efficient lookup. On other pages, dedupe process 10 may the deduplication solution discussed above, and may perform such deduplication during the cache levels hardening. Using this hybrid, the dedupe scheme smooths its utilization of system resources according to system workload.

In some implementations, deduplicating 404 the first portion of the content in the first bucket from the first cache may include identifying 408 the first portion of the content in a log, and in some implementations, deduplicating 404 the first portion of the content in the first bucket from the first cache may further include scanning 410 the log to identify the first portion of the content in the first bucket as the duplicate. For instance, another possible optimization may be that the actual hardening process (e.g., via dedupe process 10) does not have to fully perform the deduplication process. Since the deduplication process may need an additional read in cases of, e.g., a non-crypto hash, it may delay and add complexity to the hardening process. Thus, dedupe process 10 may, for hardening process, identify 408 and write to a designated log the two pages that are suspected as a duplicate noticed during the merge (e.g., as duplicate hints), and for another background thread (e.g., via dedupe process 10) to scan this log later to then later perform the full deduplication.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   identifying, by a computing device, content in a first bucket in a first cache level of a multi-level cache system;
   determining that a first portion of the content in the first bucket is a duplicate, wherein a second portion of the content in the first bucket is unique;
   hardening the first portion and the second portion of the content to a second cache level of the multi-level cache system;
   deduplicating, during the hardening, the first portion of the content in the first bucket from the first cache level; and
   storing, during the hardening, the second portion of the content in a second bucket in the second cache level, wherein a capacity of the second cache level is larger than a capacity of the first cache level.

2. The computer-implemented method of claim 1 wherein the first cache level of the multi-level cache system is in-memory.

3. The computer-implemented method of claim 1 wherein the second cache level of the multi-level cache system is in persistent storage.

4. The computer-implemented method of claim 1 wherein deduplicating the first portion of the content in the first bucket from the first cache level is based upon, at least in part, a threshold workload.

5. The computer-implemented method of claim 1 wherein deduplicating the first portion of the content in the first bucket from the first cache level includes identifying the first portion of the content in a log of potential deduplication candidates.

6. The computer-implemented method of claim 5 wherein deduplicating the first portion of the content in the first bucket from the first cache level further includes scanning the log of potential deduplication candidates to identify the first portion of the content in the first bucket as the duplicate.

7. The computer implemented method of claim 1, wherein:
hardening the first portion and the second portion of the content to a second cache level of the multi-level cache system, includes reading a first bucket in the second cache level, the first bucket in second cache level corresponding to the first bucket in the first cache level; and
deduplicating, during the hardening, the first portion of the content in the first bucket from the first cache level, includes performing a lookup of the first portion and the second portion of the content relative to the read first bucket in the second cache level.

8. The computer implemented method of claim 1, wherein hardening the first portion and the second portion of the content to a second cache level of the multi-level cache system includes determining a threshold level of fullness in the first bucket of the first cache level has been reached.

9. A computer program product residing on a computer readable storage medium having a plurality of instructions stored thereon which, when executed across one or more processors, causes at least a portion of the one or more processors to perform operations comprising:
identifying, by a computing device, content in a first bucket in a first cache level of a multi-level cache system;
determining that a first portion of the content in the first bucket is a duplicate, wherein a second portion of the content in the first bucket is unique;
hardening the first portion and the second portion of the content to a second cache level of the multi-level cache system;
deduplicating, during the hardening, the first portion of the content in the first bucket from the first cache level; and
storing, during the hardening, the second portion of the content in a second bucket in the second cache level, wherein a capacity of the second cache level is larger than a capacity of the first cache level.

10. The computer program product of claim 9 wherein the first cache level of the multi-level cache system is in-memory.

11. The computer program product of claim 9 wherein the second cache level of the multi-level cache system is in persistent storage.

12. The computer program product of claim 9 wherein deduplicating the first portion of the content in the first bucket from the first cache level is based upon, at least in part, a threshold workload.

13. The computer program product of claim 9 wherein deduplicating the first portion of the content in the first bucket from the first cache level includes identifying the first portion of the content in a log.

14. The computer program product of claim 13 wherein deduplicating the first portion of the content in the first bucket from the first cache level further includes scanning the log to identify the first portion of the content in the first bucket as the duplicate.

15. The computer program produce of claim 9, wherein:
hardening the first portion and the second portion of the content to a second cache level of the multi-level cache system, includes reading a first bucket in the second cache level, the first bucket in second cache level corresponding to the first bucket in the first cache level; and
deduplicating, during the hardening, the first portion of the content in the first bucket from the first cache level, includes performing a lookup of the first portion and the second portion of the content relative to the read first bucket in the second cache level.

16. A computing system including one or more processors and one or more memories configured to perform operations comprising:
identifying, by a computing device, content in a first bucket in a first cache level of a multi-level cache system;
determining that a first portion of the content in the first bucket is a duplicate, wherein a second portion of the content in the first bucket is unique;
hardening the first portion and the second portion of the content to a second cache level of the multi-level cache system, including reading a first bucket in the second cache level, the first bucket in second cache level corresponding to the first bucket in the first cache level;
deduplicating, during the hardening, the first portion of the content in the first bucket from the first cache level, including performing a lookup of the first portion and the second portion of the content relative to the read first bucket in the second cache level; and
storing, during the hardening, the second portion of the content in a second bucket in the second cache level, wherein a capacity of the second cache level is larger than a capacity of the first cache level.

17. The computing system of claim 16 wherein the first cache level of the multi-level cache system is in-memory.

18. The computing system of claim 16 wherein deduplicating the first portion of the content in the first bucket from the first cache level is based upon, at least in part, a threshold workload.

19. The computing system of claim 16 wherein deduplicating the first portion of the content in the first bucket from the first cache level includes identifying the first portion of the content in a log.

20. The computing system of claim 19 wherein deduplicating the first portion of the content in the first bucket from the first cache level further includes scanning the log to identify the first portion of the content in the first bucket as the duplicate.

* * * * *